Feb. 28, 1950          E. I. GREEN          2,499,001
FREQUENCY MODULATION SYSTEM FOR LOCATING
IMPEDANCE IRREGULARITIES
Filed Oct. 16, 1946          3 Sheets-Sheet 1
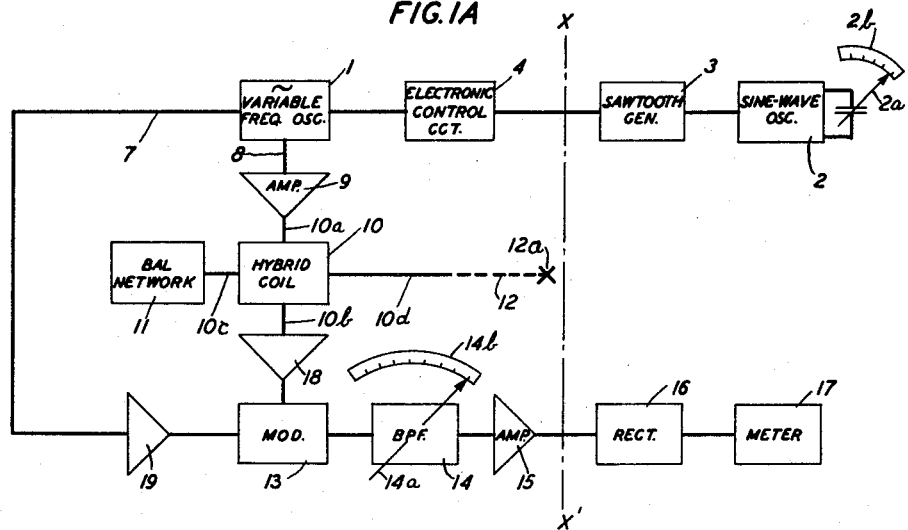
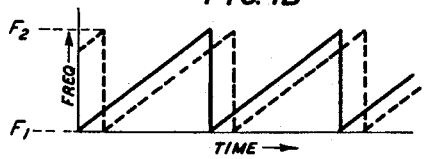
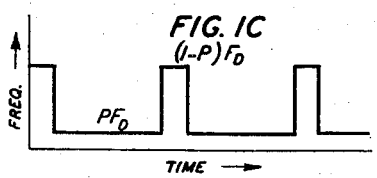
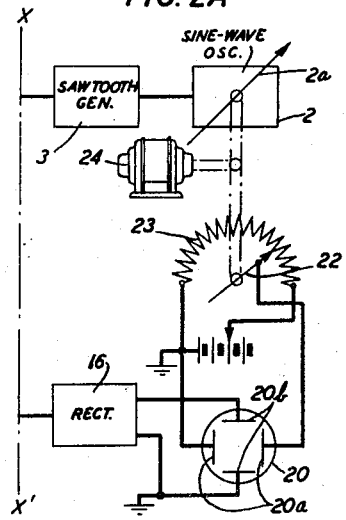
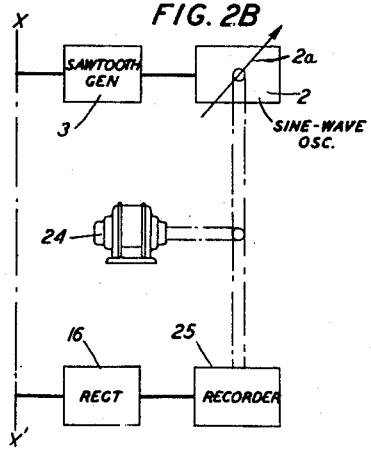
INVENTOR
E. I. GREEN
BY
N. S. Ewing
ATTORNEY Feb. 28, 1950 E. I. GREEN 2,499,001
FREQUENCY MODULATION SYSTEM FOR LOCATING
IMPEDANCE IRREGULARITIES
Filed Oct. 16, 1946 3 Sheets-Sheet 2

INVENTOR
E. I. GREEN
BY
N. D. Ewing
ATTORNEY

INVENTOR
E. I. GREEN
BY
N. D. Ewing
ATTORNEY

Patented Feb. 28, 1950

2,499,001

UNITED STATES PATENT OFFICE 2,499,001

FREQUENCY MODULATION SYSTEM FOR LOCATING IMPEDANCE IRREGULARITIES

Estill I. Green, Millburn, N. J., assignor to Bell Telephone Laboratories, Incorporated, New York, N. Y., a corporation of New York Application October 16, 1946, Serial No. 703,622

15 Claims. (Cl. 175—183)

This invention relates in general to electrical transmission and more specifically to systems for the location and measurement of impedance irregularities in transmission lines.

In accordance with one prior technique, impedance irregularities in transmission lines were located by a laborious procedure which included measuring the impedance of the line at a number of different frequencies to which the impressed oscillations were manually varied, plotting the resulting data, and determining the distance to the irregularity by computations from such graphs. By means of pulse systems which utilize a cathode ray viewing device, line irregularities may be located and measured directly in terms of echoes reflected therefrom. One disadvantage of the echo-pulse technique is the confusion which may result when a number of irregularities are present in the test line thereby producing a multiplicity of echoes. Another possible disadvantage of this method is that it is not well adapted for automatic recording of the location of irregularities if that be desired.

It is a broad object of this invention to improve the technique of locating impedance irregularities so as to overcome the disadvantages mentioned above and other disadvantages inherent in prior art systems. More specifically, it is an object of this invention to facilitate the individual location and measurement of impedance irregularities in transmission lines having a plurality of impedance irregularities.

In accordance with the present invention a frequency modulation echo system is utilized for the location and measurement of impedance irregularities in transmission lines. In its simplest form the invention is practiced by transmitting a frequency modulated electromagnetic wave through the line and beating the echo waves received from the succession of irregularities against the transmitted wave. An important feature is that the line may be scanned by either varying the modulating frequency of the transmitted wave or the detected beat frequency so that irregularities at different distances, if present, may be detected in sequence to the exclusion of other irregularities.

For the purposes of illustration, the present invention will be shown in the drawings and described in the specification hereinafter in the form of several embodiments adapted for the location and measurement of impedance irregularities in transmission lines, including coaxial circuits, conventional cable pairs, and open-wire pairs. However, it is to be understood that the invention is not limited to such applications as are specifically described herein, but may be adapted for other purposes in other types of systems, as will be apparent to those skilled in the art.

In each of the embodiments described, oscillations from a source of high frequency carrier waves are frequency modulated by the voltage output of a saw-tooth voltage wave generator. The frequency modulated output signal is then divided into two components, one of which is impressed on the transmission line under test. If an impedance irregularity is present in the line, a portion of the impressed signal is reflected back to a junction where it is combined in a modulator circuit with the signal then being transmitted, which differs in frequency from the echo by the amount of frequency change which corresponds to the round-trip time of transmission to the irregularity. The resultant beat frequency wave is passed through an intermediate frequency filter and utilized to operate an indicating meter.

In accordance with one embodiment of the invention, a device attached to the saw-tooth generator for frequency varying the modulating output voltage moves on a scale calibrated in terms of distance. The saw-tooth frequency is varied until a current deflection from the beat frequency output occurs in the indicating meter, and the distance to the irregularity is read off the calibrated scale.

In accordance with a second embodiment of the invention, the frequency of the saw-tooth generator is fixed, while the responsive frequency of the intermediate frequency filter is variable. Hence, the line is scanned and the distance to an irregularity determined by varying the responsive frequency of the filter on a calibrated scale until a current deflection occurs in the indicating meter.

In accordance with a modification which may be applied to either of the systems mentioned above, a delay circuit is connected into one of the component branches of the circuit whereby a uniform delay is imposed on all of the frequencies of one component of the frequency modulated signal wave with respect to the other, thereby increasing the resultant beat frequency with respect to the saw-tooth modulating frequency.

A further modification which may be applied to either of the aforementioned systems comprises the substitution of a cathode ray oscilloscope for the conventional indicating meter, in which case the rectified output of the intermediate frequency filter is connected to one pair of the oscilloscope deflecting plates, while a sweep circuit synchronized with the variations in saw-tooth frequency or beat frequency, as the case may be, is connected to the other pair of plates. Beat frequency current deflections are indicated on the oscilloscope screen. A circuit is also disclosed in which a recorder is substituted for the indicating meter.

Other circuits disclosed provide for heterodyning the transmitted frequency modulated signal with a constant frequency wave in order to transpose the intermediate beat frequency to a more convenient value for detection; and also for utilizing the upper and lower sidebands of the heterodyned output for the two separate signal components.

Further objects, advantages, and features of the invention will be apparent from a study of the specification as set forth hereinafter and the attached drawings, of which:

Fig. 1A shows an embodiment of the present invention in which an impedance irregularity is located either in terms of variations in saw-tooth frequency or in terms of variations in the detected beat frequency;

Fig. 1B shows frequency plotted against time for (a) the transmitted frequency modulated signal; (b) a reflected signal;

Fig. 1C shows frequency plotted against time for the beat frequencies produced by the superposition of the transmitted and reflected signals indicated in Fig. 1B;

Fig. 2A shows a modification of the embodiment of Fig. 1A in which a cathode ray oscilloscope replaces the indicating meter;

Fig. 2B shows a modification of the embodiment of Fig. 1A in which a recorder replaces the indicating meter;

Figure 3A:
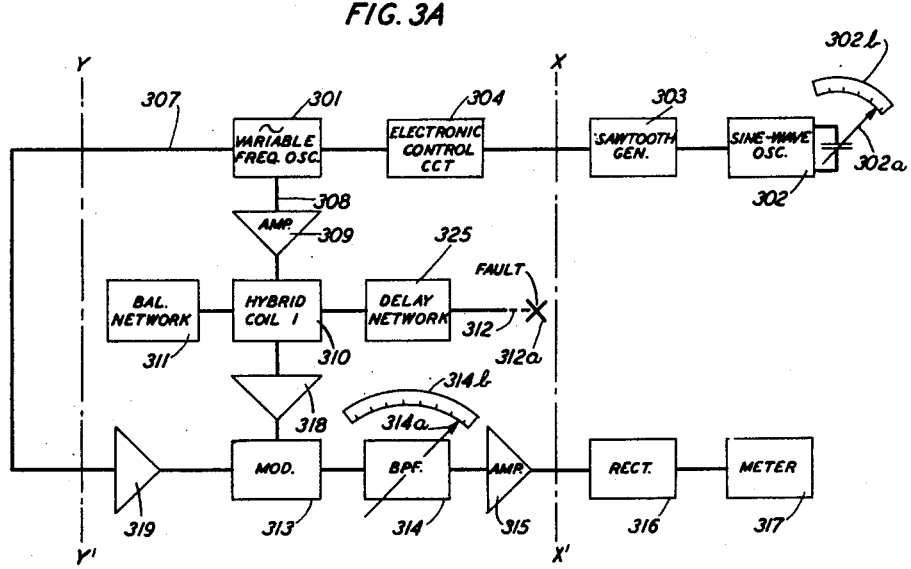
Fig. 3A shows a modification of the embodiment of Fig. 1A in which a delay network is inserted in series with the line circuit.

In locating impedance irregularities in transmission lines by the frequency modulation echo technique of the present invention, the measuring frequency is usually swept over only a comparatively narrow band. For a better understanding of the requirements for such a system, consideration will first be given to the distances over which measurements are needed on repeatered transmission lines and the possible range and location of the frequency sweep. The minimum distance for location of irregularities is preferably less than half a repeater section or even shorter. Short distances which it is difficult to measure from one end of the line frequently can be measured from the other end. The frequency range swept over is limited by flatness of line delay. In general the velocity is more nearly uniform, the higher the frequency. However, a higher mid-frequency without correspondingly wider sweep increases the effect of error in the frequency modulating oscillator. Also the line attenuation is greater at higher frequencies, necessitating greater receiving gain, and making noise limitations more severe. On the other hand, it may be desirable, particularly in case of a coaxial system, to use frequencies approaching the top of the carrier band in order to locate small reactance irregularities.

For the purposes of illustration, Table I below lists several common types of transmission line systems, showing in each case, (1) a possible distance range for operation of an impedance irregularity locating system in accordance with the present invention; (2) possible values for the mean carrier frequency and approximate upper and lower limits of modulating frequency sweep; and (3) the velocity of signal travel.

Table I

| | Distance Range, Mi. | | Freq. Sweep, Kc./sec. | Velocity, Mi./sec. |
| --- | --- | --- | --- | --- |
| | d min. | d max. | | |
| Coaxial Cable | 1 | 5 | 500±100 | 180,000 |
| Conventional Cable Pairs | 5 | 20 | 50± 5 | 125,000 |
| Open-wire Lines | 25 | 100 | 60± 15 | 180,000 |

For some purposes, especially in studying reactance irregularities, it may be found advantageous to make several measurements at more than one location for the sweep range.

One type of system in accordance with the present invention, which is shown schematically in Fig. 1A, imposes a saw-tooth modulating envelope of variable frequency on the transmitted signal. The latter is then separated into two components, one of which is impressed on the test line, and the other of which is conducted directly to a beat frequency modulator where it is recombined with that portion of the first component reflected from whatever irregularities are present in the test line. The resultant beat-frequency output is filtered for a predetermined fixed frequency. The line is tested by varying the saw-tooth frequency over a scale which may be calibrated in terms of distance and observing the presence of echoes as indicated in a current recording device.

The system of Fig. 1A comprises the following cooperating circuit elements. The variable frequency oscillator 1 is adapted to generate electromagnetic oscillations over a range of carrier frequencies. The frequency output of the oscillator 1 is adapted to be periodically swept in a manner which increases linearly with time over a predetermined range of frequencies in accordance with the voltage variations of a modulating circuit which comprises the sine wave oscillator 2, the saw-tooth generator 3, and the electronic control circuit 4, all of which are connected in series in the order named to the variable frequency oscillator 1. The sine wave oscillator 2, which is a conventional type adapted to generate sinusoidal output voltages having frequencies in the range from 1 to 50 kilocycles, is equipped with a device 2a, such as a variable condenser, for either manually or automatically varying its frequency output over the desired range, which device has an attached pointer adapted to move over a scale 2b which may be calibrated in terms of distance. The output of the sine wave oscillator 2a acts as a synchronizing voltage in the circuit of the saw-tooth generator 3, which may comprise a relaxation oscillator of any of the types well known in the art adapted to generate a periodic saw-tooth voltage which increases linearly with time from a minimum to a maximum value. The saw-tooth output voltage from the generator 3 is fed into the electronic control circuit 3, which may comprise a so-called reactance tube circuit of the type shown in Fig. 6, page 1133, and described by C. Travis in an article entitled "Automatic frequency control," Proc. of the Institute of Radio Engineers, vol. 23, No. 10, October 1935. The reactance tube circuit 4 operates in response to the varying magnitude of the saw-tooth voltage applied to its input to vary the reactance of the tuned circuit of the oscillator 1, to which it is coupled, thereby frequency modulating the output signal of the oscillator 1. To those skilled in the art, it will be apparent that mechanical means for frequency modulating the output of the oscillator 1 may be substituted for the electronic means disclosed in Fig. 1A.

The frequency modulated output of the variable frequency oscillator 1 is impressed on the parallel branches 7 and 8. The branch 8 is connected through the conventional amplifier 9 to the input terminal of a hybrid coil 10 having four terminals. The hybrid coil 10, of a type well known in the art, such as described, for example, on page 524 of "Magnetic circuits and transformers" by members of the electrical engineering staff of Massachusetts Institute of Technology, John Wiley and Sons, 1943, is so arranged that the output circuit 10b presents a high impedance to signals impressed on the input circuit 10a, causing the input energy to divide equally between the collateral branches 10c and 10d. The branch 10d is connected to the test line 12 while the opposite branch 10c is connected to a conventional balancing network 11 which has impedance characteristics similar to those of the test line 12 when in normal operating condition with no appreciable irregularities present. Energy reflected from an irregularity 12a in the line 12 causes a potential to be impressed on the output terminal 10b and hence on the input of the conventional modulating circuit 13 through a series connection which may include the conventional amplifying circuit 18.

The branch 7 from the output of the variable frequency oscillator 1 is connected to the input of the modulating circuit 13 through the amplifier 19 so that the reflected energy from the test line 12 is superposed on, or beaten against, the unreflected transmitted signal from the oscillator 1, producing a beat frequency which, as will be apparent from discussion of Figs. 1B and 1C is constant for a fixed distance and fixed saw-tooth frequency but varies in accordance with the distance to the irregularity 12a and the frequency of the modulating saw-tooth frequency. If the detecting circuit is focused for a particular beat frequency, the saw-tooth frequency, or the frequency of the sine wave-oscillator 2 may be calibrated in terms of the distance to the irregularity. The conventional band-pass filter 14 performs the function of filtering out a predetermined fixed beat frequency, which is of the order of magnitude indicated hereinafter, the output from the filter 14 being fed through the conventional amplifying circuit 15 and the rectifying circuit 16 to a current indicating device 17, such as an ammeter. Thus, the line under test is scanned by varying the frequency of the sine wave oscillator 2, by manual or automatic operation of the means 2a, until reflected energy from a line irregularity 12a produces the particular beat frequency to which the fixed frequency filter 14 is responsive, thereby causing a deflection of the meter 17. The relative magnitudes of different impedance irregularities will be indicated by the corresponding magnitudes of indicator currents (making due allowance for line attenuation) and the system may be calibrated for absolute magnitude by inserting an irregularity of known value.

The operation of the circuit will be better understood from the following theoretical considerations.

Let the frequency modulating oscillator be swept between a minimum frequency $F_1$ and a maximum frequency $F_2$, the difference between these two limits being designated $F_D$.

Assume that the oscillator is swept by means of a saw-tooth generator whose rate is $F_S$. The period for one cycle of the saw-tooth is then $$T_S = \frac{1}{F_S} \qquad (1)$$

If the frequency modulating wave is reflected from a point at a distance $d$, the echo wave is delayed by the interval $$T_R = \frac{2d}{V} \qquad (2)$$

where $V$ is the velocity of propagation. Let the ratio $T_R/T_S$ be designated $\rho$. Then $$F_S = \rho \frac{V}{2d} \qquad (3)$$

Now if the echo wave is beaten against the transmitted wave, two different beat frequencies are produced during one cycle of the saw-tooth, as will be apparent from Figs. 1B and 1C. The sum of these two frequencies is equal to the frequency difference $F_D$. The lower beat frequency is:

$$F_L = \rho F_D \qquad (4)$$

while the higher one is:

$$F_U = (1-\rho) F_D \qquad (5)$$

The lower frequency is present during the part of the cycle represented by $1-\rho$, while the higher frequency is present during the remainder of the cycle. When the value of $\rho$ is 0.5, the two beat frequencies become identical and equal to $$\frac{F_D}{2}$$

In using a circuit of the type shown in Fig. 1A, the intermediate frequency filter may be assigned to $F_D/2$, corresponding to $\rho=0.5$. Alternatively this filter may be assigned to some other frequency in which case there are these possibilities:

(a) Only the lower beat frequency may be employed. This is particularly desirable when $\rho$ is very small, so that the lower beat frequency is present during most of the cycle. Small nicks are cut out of this frequency at the saw-tooth rate.

(b) The two beat frequencies may be employed conjointly. If a frequency equal to $F_D$ is added to the modulator of Fig. 1A, the upper beat frequency modulates with this to produce the lower (or vice versa).

An alternative to the variable saw-tooth fixed beat frequency system hereinbefore described is a fixed saw-tooth variable beat frequency system.

The circuit of Fig. 1A can be simply adapted to such type of operation by fixing the frequency of the sine wave oscillator 2 and attaching a means 14a to the band-pass filter 14 in order to vary the responsive frequency over the desired range of beat frequencies. As in the former embodiment, a pointer may be attached to the means 14a which is adapted to move over a scale 14b calibrated in terms of distances. Thus, impedance irregularities in the line 12 are located by varying the means 14a to scan over the range of beat frequencies and observing the deflections of the current indicator 17.

Instead of observing the impedance irregularity indications successively on the meter 17 as indicated in the circuit of Fig. 1A, a complete picture may be provided on the screen of a cathode ray oscilloscope by means of the circuit substitutions as shown in Fig. 2A of the drawings. For this purpose the filtered beat frequency output is impressed on the vertical deflecting plates of the oscilloscope, and a sweep synchronous with the variations in either saw-tooth frequency or beat frequency, according to whichever of these parameters is variable, is applied to the horizontal deflecting plates.

Referring to Fig. 2A, the circuit there shown may be considered as replacing that portion of Fig. 1A, to the right of the line X—X', the circuit elements being the same to the left of the line X—X' as hereinbefore described with reference to Fig. 1A. The output current of the rectifier 16 is connected to the vertical deflecting plates 20a of a conventional cathode ray oscilloscope 20. The horizontal deflecting plates 20b of the oscilloscope 20 are connected to a sweep circuit which is synchronized with the frequency variations of the sine-wave oscillator 2. The frequency varying device 2a is mechanically coupled to the slider 22 on the potential divider 23 and both may be driven by a motor 24. The divider 23 is connected to the horizontal deflecting plates 20b. Through operation of this circuit, all the line irregularities at various distances within a given range are displayed on the screen of the oscilloscope 19 as vertical deflections or "pips" along a horizontal axis calibrated in terms of their respective distances from the test line terminal. In accordance with the modified form of Fig. 1A in which the saw-tooth frequency is fixed and the filter 14 is responsive to a variable range of beat frequencies, the slider 22 on the potentiometer 23 may be mechanically coupled to the means 14a. In this case, the indication on the screen would be substantially the same as in the case of the variable saw-tooth.

If a record of impedance irregularities versus distance is desired, the arrangement of Fig. 2B may be used. In this case the motor 24 drives both the frequency varying device 2a and the recorder 25 of a type well known in the art which is connected to the rectifier 16.

Analysis of the relationship involved in the methods of Fig. 1A shows that the relatively narrow frequency sweep desirable on wire lines, and the extremely short echo times involved, are two factors which tend to define the working range. On the one hand, it is desirable that the beat frequency be large so that the effect of non-linearity in the frequency modulating oscillator will be small. On the other hand, a larger value of beat frequency means a correspondingly greater saw-tooth rate. However, it is desirable that the maximum saw-tooth rate be small in comparison with the total frequency sweep. In other words, the modulation index should be large. The physical reason for this is that, as the modulation index becomes small, side frequencies are produced which result in spurious responses in the receiving equipment. The desirable limit for the ratio of frequency sweep to saw-tooth rate is not known, but unless special receiving equipment is provided this ratio should probably be around 100.

Another embodiment of the invention shown in Fig. 3A of the drawings has certain advantages over the systems described hereinbefore, in that it provides for increasing the beat frequency without increasing the frequency of the modulating saw-tooth envelope. Such increase in the beat frequency with respect to the saw-tooth frequency is brought about by introduction in series with the test line 312 of a supplementary delay circuit 325 which has a constant attenuation over the sweep range of frequencies. The remaining circuit elements are similar in structure and function to the circuit elements described hereinbefore with reference to Fig. 1A, the last two digits of similar elements corresponding, so that the variable frequency oscillator 301 is similar to the variable frequency oscillator 1, etc.

Defining terms as before, let the ratio $F_L/F_D$ be designated as $\mu$; and the round-trip delay of the network 325 as $T_N$.

Figure 3B:
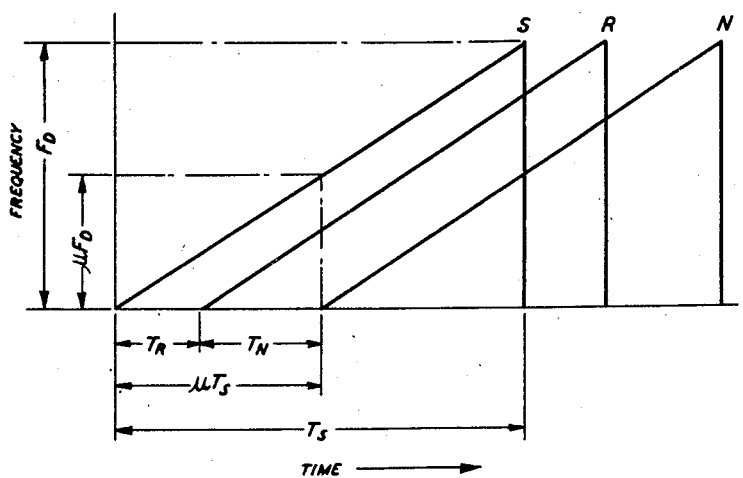
Fig. 3B shows frequency plotted against time for the initial and delayed components of the frequency modulated wave illustrative of the operation of the circuit of Fig. 3A.

Referring to Fig. 3B it will be seen that $$T_R + T_N = \mu T_S \qquad (6)$$

It is assumed that the delay has a fixed value. If the saw-tooth rate is also fixed, then $\mu$, and hence the beat frequency $F_L$, will vary. If, on the other hand, the beat frequency is fixed, then the saw-tooth rate will vary. Either type of system can be used.

In the systems described hereinbefore it may occur that the intermediate frequency which results from beating the echo wave against the locally generated wave does not fall at an optimum frequency location for detection. In such case a different location for the intermediate frequency may be obtained by heterodyning the locally generated wave to a different frequency. This involves introducing the circuit changes shown in Fig. 4 of the drawings, whereby one of the frequency modulated signal components of the oscillator 401 is introduced through the output circuit 407 into a modulating circuit 426 where it is superposed on the constant frequency output of the independent carrier oscillator 427. The heterodyned output of the modulator 426 is then passed through the band-pass filter 428 in order to select the desired sideband frequency, which is then combined with the reflected signal component in the modulator 413. Except for the differences mentioned, operation of the circuit of Fig. 4 is substantially as described with reference to Fig. 1A, the last two digits of similar elements corresponding.

Figure 4:
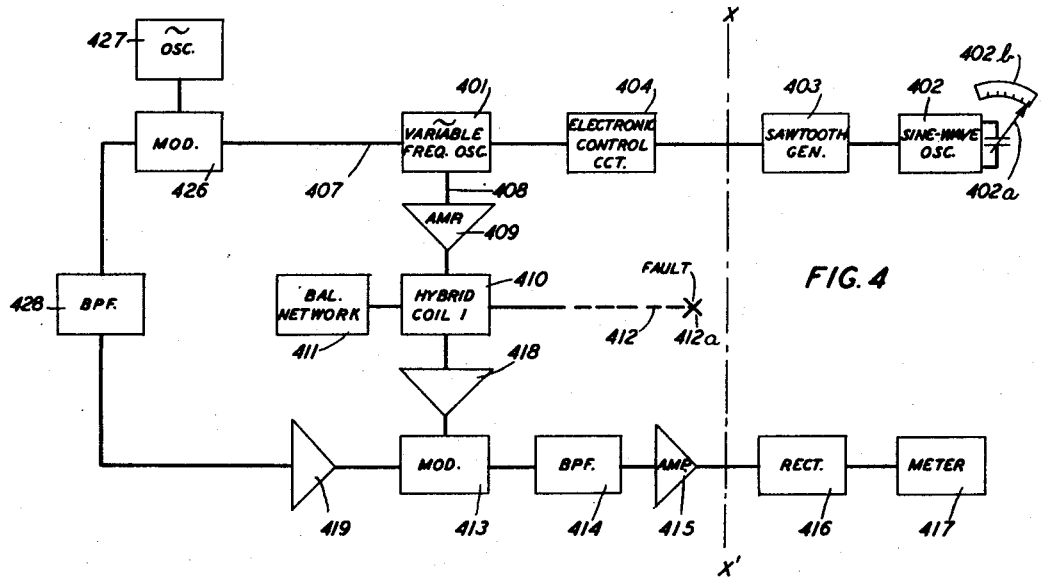
Fig. 4 shows a modification of the circuit of Fig. 1A in which one component of the frequency modulated signal is heterodyned to a more convenient frequency.
Figure 5:
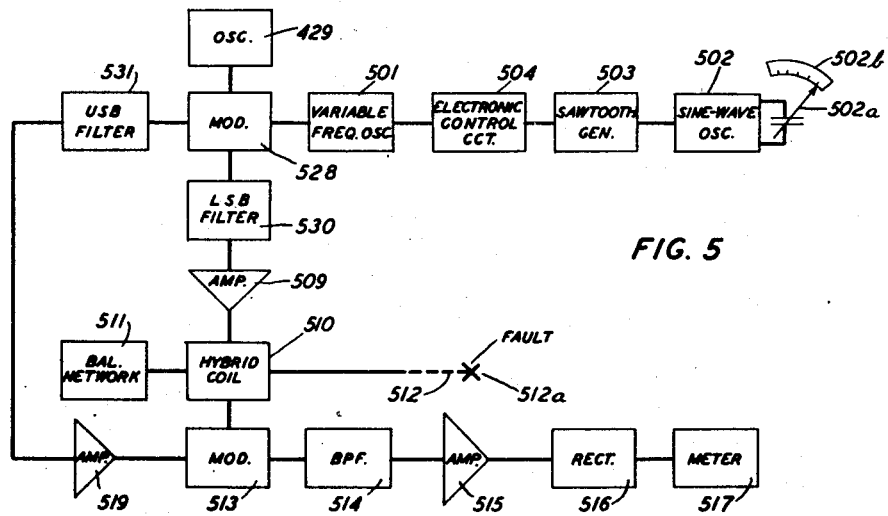
Fig. 5 shows an embodiment in which the upper and lower sidebands of the heterodyned frequency modulated signal output are respectively utilized in the different component branches of the circuit.

The method of Fig. 4 should preferably have a correction for any delay distortion that may be present in the band-pass filter 428. An alternative arrangement is shown in Fig. 5. In this system, the entire output of the variable frequency oscillator 501 is applied forthwith to a modulator 528, where it is heterodyned with the constant frequency output of the oscillator 429. The lower sideband of the heterodyned signal is impressed on the test line through a circuit which includes the lower sideband filter 530, while the upper sideband passing through the filter 531 and the amplifier 519 is fed directly to the beat frequency modulator 513 and utilized for detection. The delays of the upper and lower sideband filters 531 and 530 may thus be made the same. The operation of the system with the exception of the changes mentioned is substantially the same as described hereinbefore with reference to Fig. 1A. Alternatively, by making the two filters 530 and 531 alike, the modulator 528 serves to shift the frequency range to a range suitable for the line, while leaving the electronically controlled oscillator in a range best adapted for such control.

Figure 6:
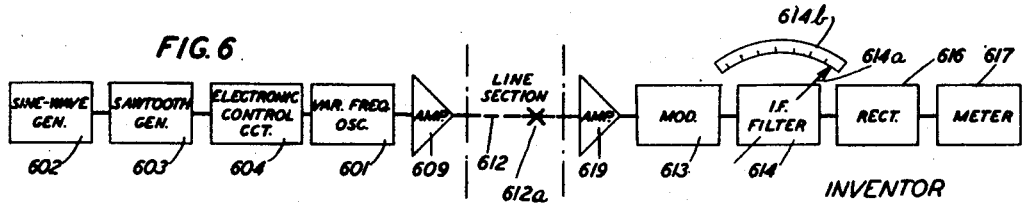
Fig. 6 shows a modified system in accordance with the invention whereby locating measurements are made at the end of the line remote from the transmitting point of the testing signal.

All of the systems described hereinbefore are near-end methods, i. e., they involve transmission of the measuring current from one end of the line to the irregularity and study of the echo at the same, or near end of the line. In normal transmission over carrier systems one is concerned primarily with effects at the far end. Since two irregularities or reflections interact to produce an interfering echo which travels in the same direction as the signal, there may, under certain conditions, be advantage in measuring echo effects at the far end. A system for this purpose is shown in Fig. 6.

The carrier frequency output of the variable frequency oscillator 601 is frequency modulated by the voltage output of a modulating circuit which includes the sine wave generator 602, the saw-tooth generator 603 and the electronic control circuit 604, which are connected to function in a similar manner to corresponding elements as described with reference to Fig. 1A, with the exception that the saw-tooth frequency is fixed. The frequency modulated output of the oscillator 601 is passed through the conventional amplifier 609 and impressed on the repeatered line section 612. An irregularity 612a is present in the line 612, a portion of the transmitted energy is reflected back to an impedance mismatch at the near-end terminal of the line, and again reflected, being passed through the amplifier 619 and superposed on an unreflected signal component in the modulator circuit 613. The beat frequency output of the modulator 613 is passed through the intermediate frequency filter 614, which may be varied by means of the device 614a over a range of responsive frequencies as in the case of the alternative embodiment of Fig. 1A hereinbefore discussed. Thus, distances to line irregularities are measured by varying the device 614a on the scale 614b until a current deflection is observed in the meter, and reading the distance to the irregularity from the scale. Interference from second and higher order reflections is inappreciable because of their attenuation. It is apparent that the system of Fig. 6 may be so designed that a cathode ray oscilloscope replaces the current indicating meter 617 for recording the impedance irregularities in the manner discussed hereinbefore with refence to Fig. 2A.

Other embodiments than the several described herein will be apparent to those skilled in the art as being within the scope of the present invention; and it is to be understood that systems in accordance with the present invention are not to be construed as limited to the use of any of the particular circuits or apparatus shown.

What is claimed is:

1. A system for locating impedance irregularities in a transmission line which comprises in combination a generator of linear saw-tooth waves of a selected frequency, means for varying the frequency of said saw-tooth generator, a source of variable frequency carrier oscillations, control means connected to said carrier frequency source and said saw-tooth generator to modulate the frequency of said carrier oscillations in accordance with the output voltage of said saw-tooth generator, a modulating circuit with the input thereof connected to said source to receive an unreflected component of said saw-tooth modulated carrier oscillations, a transforming device having input and output terminals in conjugate relation and a third terminal electrically coupled to said input and output terminals and connectable to said transmission line, the input terminals of said transforming device connected to said source, the input of said modulating circuit connected to the output terminals of said transforming device to receive a component of said saw-tooth modulated carrier oscillations reflected from an irregularity in said line, whereby said reflected and unreflected components are beaten together to form a substantially constant beat frequency, a frequency selective device connected to receive a preselected beat frequency from said moduating circuit, and a current indicating device connected to said frequency selective device, whereby the frequency of said saw-tooth generator can be varied until a beat frequency produced in said modulating circuit corresponds to the preselected frequency of said frequency selective device thereby causing said indicating device to respond to current passing through said frequency selective device from said modulating circuit.

2. A system in accordance with claim 1 in which said current indicating device is replaced by a cathode ray oscilloscope having an indicating screen, a source of a beam of electrons, and respective horizontal and vertical deflectors, one of said deflectors being connected to the output of said frequency selective device the other of said deflectors connected to a second sweep generator, means connected to said second saw-tooth generator for synchronizing the frequency thereof with the variations in frequency of said first saw-tooth generator, whereby the locations of the irregularities on said test line are displayed on said screen.

3. A system in accordance with claim 1 in which said current indicating device is replaced by a recorder, means connected to said recorder to operate said recorder in synchronizing with said means for varying the frequency of said saw-tooth generator.

4. A system in accordance with claim 1 in which a delay network is inserted in one of said circuit branches to appreciably change the delay characteristics of said branch with respect to another branch of said circuit, whereby the component frequency modulated signal in one said branch is delayed in phase with respect to the component frequency modulated signal in the other said branch.

5. A system in accordance with claim 1 in which a heterodyne modulator having an independent source of oscillations connected thereto is connected in one of said circuit branches.

6. A system in accordance with claim 1 in which a heterodyne modulator having an independent source of oscillations connected thereto is connected to the output of said variable frequency oscillator, and at least two said circuit branches are connected to the output of said heterodyne modulator, one of said circuit branches being connected to a frequency selective device responsive to the upper side-band frequencies in the output of said heterodyne modulator, and the other of said circuit branches being connected to frequency selective device responsive to the lower side-band frequencies in the output of said heterodyne modulator.

7. A system for locating impedance irregularities in a transmission line which comprises in combination a generator of linear saw-tooth waves of a fixed frequency, a source of variable frequency carrier oscillations, control means connected to said carrier frequency source and said saw-tooth generator to modulate the frequency of said carrier oscillations in response to the output voltage of said saw-tooth generator, a modulating circuit with the input thereof connected to said source to receive an unreflected component of said saw-tooth modulated carrier oscillations, a transforming device having input and output terminals in conjugate relation and a third terminal electrically coupled to said input and output terminals and connectable to the transmission line under test, the input terminals of said transforming device connected to said source, said modulating circuit connected to the output terminals of said transforming device to receive a component of said saw-tooth modulated carrier oscillations reflected from an irregularity in said line, whereby said reflected and unreflected components are beaten together to form a substantially constant beat frequency, a frequency selective device connected to said modulating circuit, said frequency selective device tunable to different preselected frequencies within a given frequency range, means connected to said frequency selective device to vary the preselected frequency to which it is responsive, and a current indicating device connected to said frequency selective device, whereby the preselected frequency of said frequency selective device can be varied until a beat frequency produced in said modulating circuit corresponds to the pass frequency of said frequency selective device thereby causing said indicating device to show a deflection in the current passing therethrough from said modulating circuit.

8. A system in accordance with claim 7 in which said current indicating device is replaced by a cathode ray oscilloscope having an indicating screen, a source of a beam of electrons, and respective horizontal and vertical deflectors, one of said deflectors being connected to the output of said frequency selective device and the other of said deflectors being connected to a second saw-tooth generator, means connected to said second saw-tooth generator for synchronizing the frequency thereof with the variations in frequency to which said frequency selective device is responsive whereby the locations of the irregularities on said test line are displayed on said screen.

9. A system for locating impedance irregularities in a section of transmission line which comprises in combination a saw-tooth generator, means for varying the frequency of said saw-tooth generator, a source of variable frequency carrier oscillations, control means connected to said carrier frequency source and said saw-tooth generator to modulate the frequency of said carrier oscillations in accordance with the output voltage of said saw-tooth generator, the output of said variable frequency oscillator connected to one terminal of said section of said transmission line, the input of a modulating circuit connected to the other terminal of said section, a frequency selective device connected to the output of said modulator circuit, and a current indicating device connected to receive the output of said frequency selective device, whereby the frequency of said saw-tooth generator can be varied until said indicating device responds to current passing through said frequency selective device from said modulator circuit.

10. A system for locating impedance irregularities in a section of transmission line which comprises in combination a saw-tooth generator, a source of variable frequency carrier oscillations, control means connected to said carrier frequency source and said saw-tooth generator to modulate the frequency of said carrier oscillations in response to the output voltage of said saw-tooth generator, the output of said variable frequency oscillator being connected to one end of said section of said test transmission line, the input of a modulator circuit connected to the other end of said section, a frequency selective device connected to the output of said modulator circuit, means connected to said frequency selective device to vary the range of frequencies to which it is responsive, a current indicating device connected to said frequency selective device whereby the frequency range of said frequency selective device can be varied until said indicating device responds to current passing therethrough.

11. A system for locating impedance irregularities in a transmission line which comprises in combination a generator of linear saw-tooth waves of a first frequency, a source of variable frequency carrier oscillations, control means connected to said carrier source and said saw-tooth generator to frequency modulate said carrier oscillations in accordance with the output voltage of said saw-tooth generator, at least two branches connected to the output of said carrier source, a modulating circuit, one of said branches connected to the input of said modulating circuit, a transforming device, said transforming device having input and output terminals in conjugate relation, a second of said branches connected to the input terminals of said transforming device, said transforming device having a third set of terminals coupled with said terminals in conjugate relation and connectable to said transmission line, the output terminals of said transforming device connected to the input of said modulating circuit, a frequency selective device connected to the output of said modulating circuit, said frequency selective device constructed to selectively transmit waves of a second frequency, a current indicating device connected to said frequency selective device, and means for varying one of said first and second frequencies.

12. A system for locating impedance irregularities in an electrical transmission line which comprises in combination a generator of linear saw-tooth oscillations of a selected frequency, a device connected to said saw-tooth generator to vary the frequency of said saw-tooth oscillations over a given range of frequencies, a distance indicator connected to said device calibrated to indicate distance to said irregularities in terms of said saw-tooth oscillation frequency, a generator of carrier waves, a control circuit connected to said carrier wave generator and said saw-tooth generator for frequency modulating said carrier waves in accordance with said saw-tooth oscillations, a transforming device having input and output terminals in conjugate relation and a third terminal connectable to a conductor of said transmission line, the input terminals of said transforming device connected to said generator of carrier waves, a modulating circuit connected to said generator of carrier waves and to the output terminals of said transforming device, whereby said modulating circuit receives and beats together an unreflected component of said saw-tooth modulated oscillations with a component thereof reflected from an irregularity in said line to produce a substantially constant beat frequency, a frequency selective circuit connected to said modulating circuit and tuned to a selected frequency within the range of beat frequencies generated in said modulating circuit, and a current indicating device connected to said frequency selective circuit.

13. A system for locating impedance irregularities in an electrical transmission line which comprises in combination a generator of linear saw-tooth oscillations of a fixed frequency, a generator of carrier waves, a control circuit connected to said carrier wave generator and said saw-tooth generator for frequency modulating said carrier waves in accordance with said saw-tooth oscillations, a transforming device having input and output terminals in conjugate relation and a third terminal connectable to a conductor of said transmission system, the input terminals of said transforming device connected to said generator of carrier waves, a modulating circuit connected to said generator of carrier waves and to the output terminals of said transforming device, whereby said modulating circuit receives and beats together an unreflected component of said saw-tooth modulated oscillations with a component thereof reflected from a fault in said line to produce a substantially constant beat frequency, a frequency selective device connected to said modulating circuit, a device for tuning said frequency selective circuit to a beat frequency generated in said modulating circuit, a distance indicator connected to said tuning device calibrated to indicate the beat frequency passed by said frequency selective device, and a current indicating device connected to said frequency selective circuit.

14. A system for locating multiple wave reflection points in a high frequency electrical transmission line comprising, in combination, a source of carrier waves of variable frequency; a device for generating periodic saw-toothed waves that vary in amplitude substantially linearly with time during each period; means controlled by said generating device to vary the frequency of said carrier wave source in conformity with the variations in amplitude of said saw-toothed waves; a modulator; hybrid coil means having a first pair of terminals for connection to the line, a second pair of terminals connected to said carrier wave source to supply the carrier waves of varying frequency to the line, whereby the carrier waves so supplied are reflected from the successive wave reflection points, and a third pair of terminals that are conjugate to said second pair of terminals and connected to said modulator to deliver the reflected carrier waves thereto; means to deliver unreflected carrier waves directly from said carrier wave source to said modulator whereby said modulator produces beat waves of different frequencies each depending on the distance to a corresponding reflection point in the line; a filter device connected to said modulator and adapted to selectively transmit waves at an operating frequency within the frequency range of the said beat waves produced thereby; current indicating means connected to said filter device to receive the beat waves transmitted thereby; and means to adjust the operating frequency of one of said devices to permit the said beat waves of different frequencies to pass in succession through said filter device.

15. A system for locating multiple wave reflection points in a high frequency electrical transmission line comprising, in combination, a source of carrier waves of variable frequency; a device for generating periodic saw-toothed waves that vary in amplitude substantially linearly with time during each period; means controlled by said generating device to vary the frequency of said carrier wave source in conformity with the variations in amplitude of said saw-toothed waves; a modulator; hybrid coil means having a first pair of terminals for connection to the line, a second pair of terminals connected to said carrier wave source to supply the carrier waves of varying frequency to the line, whereby the carrier waves so supplied are reflected from the successive wave reflection points, and a third pair of terminals that are conjugate to said second pair of terminals and connected to said modulator to deliver the reflected carrier waves thereto; means to deliver unreflected carrier waves directly from said carrier wave source to said modulator whereby said modulator produces beat waves of different frequencies each depending on the distance to a corresponding reflection point in the line; means to adjust the periodicity of said saw-toothed wave generating device and thereby to adjust said beat wave frequencies; band-pass filter means connected to said modulator to selectively transmit the several said beat waves produced thereby as the periodicity of said generating device is adjusted; and current indicating means connected to receive the beat waves selectively transmitted by said filter means.

ESTILL I. GREEN.

REFERENCES CITED

The following references are of record in the file of this patent:

UNITED STATES PATENTS

| Number | Name | Date |
|---|---|---|
| 2,143,094 | Swift | Jan. 10, 1939 |
| 2,214,130 | Green et al. | Sept. 10, 1940 |
| 2,253,975 | Guanella | Aug. 26, 1941 |
| 2,258,677 | Dresser | Oct. 14, 1941 |
| 2,268,587 | Guanella | Jan. 6, 1942 |
| 2,315,450 | Nyquist | Mar. 30, 1943 |
| 2,436,672 | Sanders | Feb. 24, 1948 |

FOREIGN PATENTS

| Number | Country | Date |
|---|---|---|
| 542,634 | Great Britain | Jan. 21, 1942 |

OTHER REFERENCES

Publication Journal of Instit. of Elect. Engrs. for January 1947, pages 61–63.